March 8, 1938. A. B. BOIARSKY 2,110,696
BRAKE CONSTRUCTION
Filed May 29, 1937 2 Sheets—Sheet 1
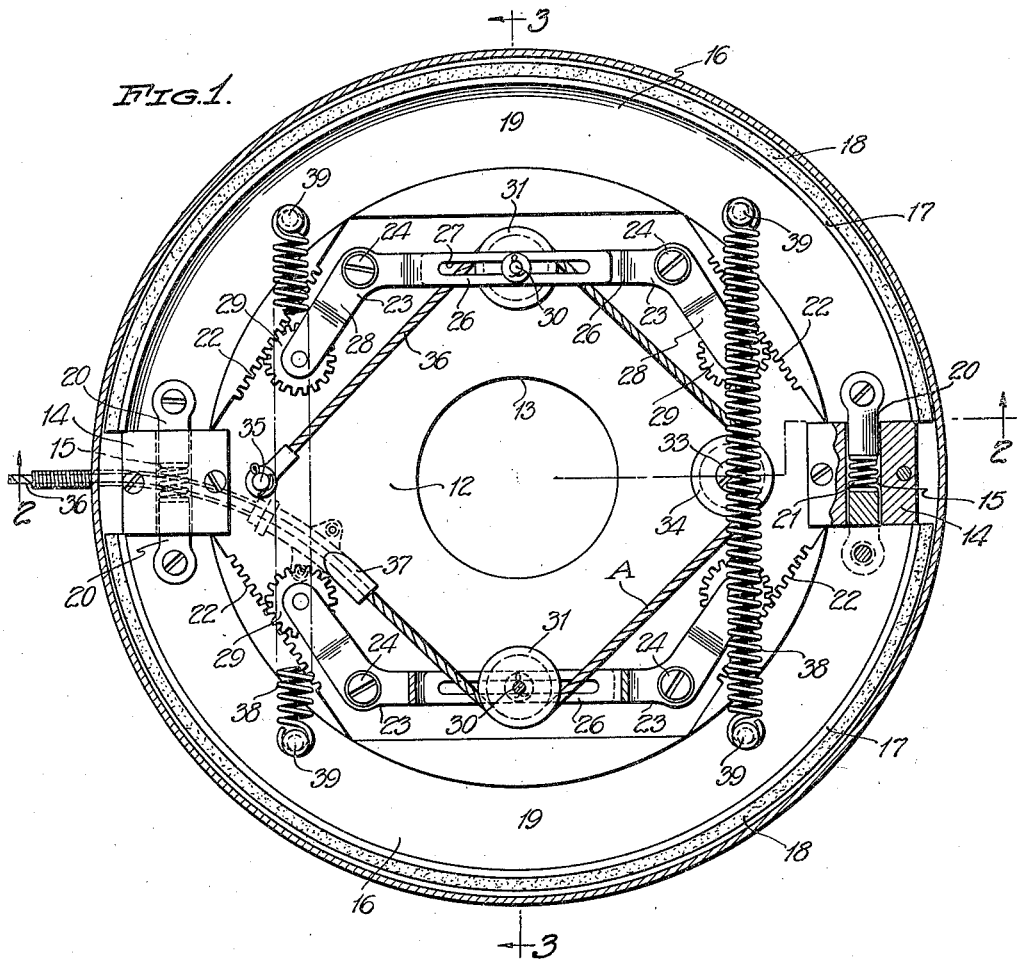
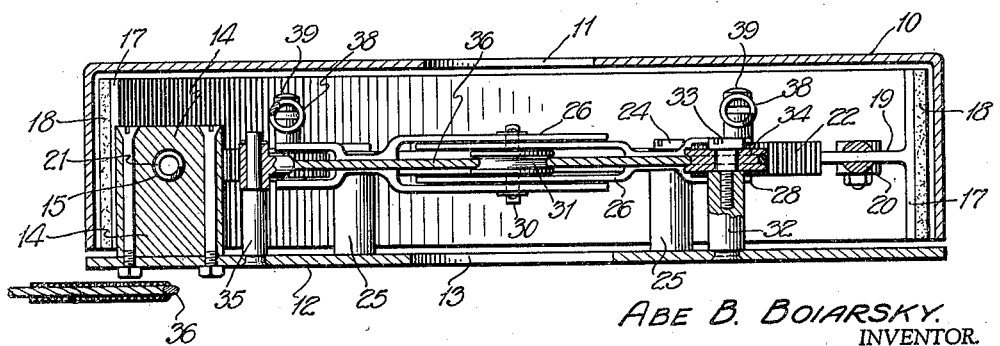
ABE B. BOIARSKY.
INVENTOR.
BY Ely & Pattison.
ATTORNEYS.

March 8, 1938.  A. B. BOIARSKY  2,110,696
BRAKE CONSTRUCTION
Filed May 29, 1937   2 Sheets-Sheet 2
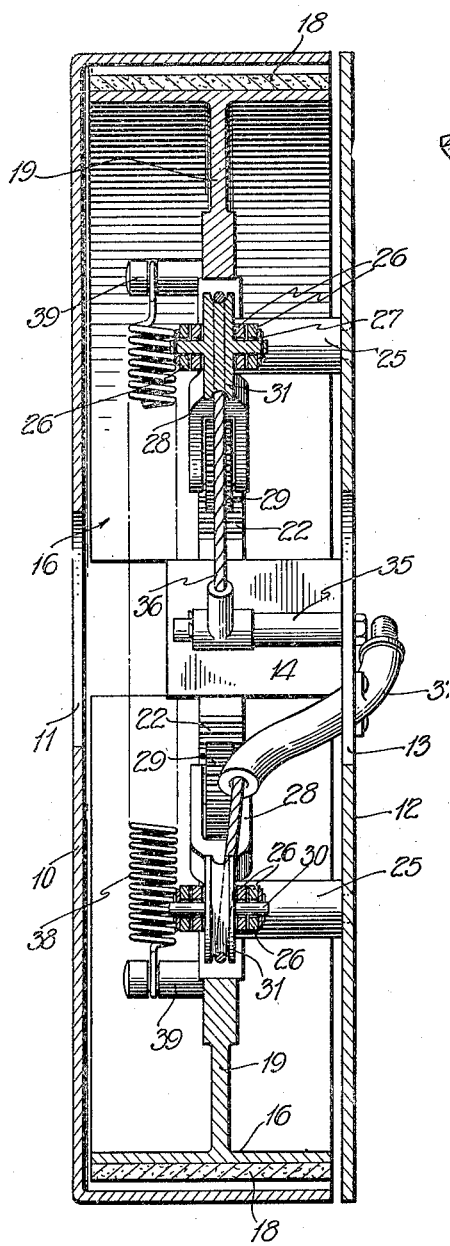
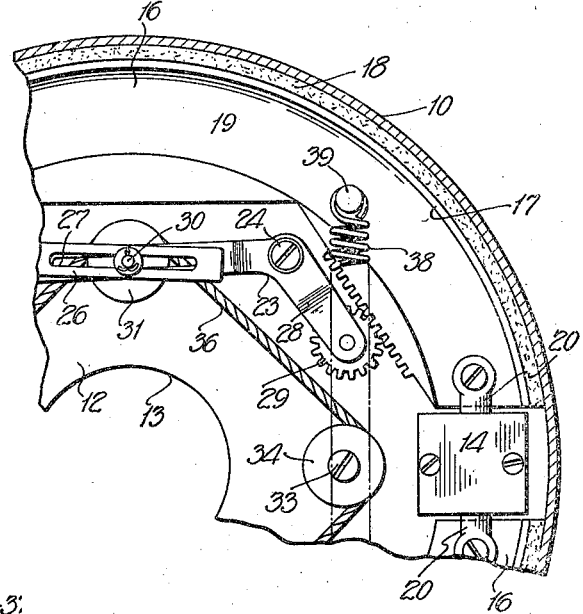
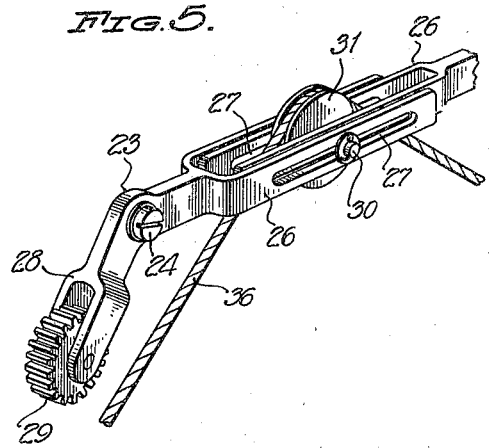
ABE B. BOIARSKY.
INVENTOR.
BY Ely & Pattison.
ATTORNEYS.
WITNESS:

Patented Mar. 8, 1938

2,110,696

UNITED STATES PATENT OFFICE 2,110,696

BRAKE CONSTRUCTION

Abe B. Boiarsky, New York, N. Y.

Application May 29, 1937, Serial No. 145,486

10 Claims. (Cl. 188—78)

This invention relates to improvements in brake constructions and more particularly to mechanically operated brakes for motor vehicles.

One of the important objects of the invention resides in a brake construction wherein the entire braking surface of the brake shoes is brought into contacting engagement with the brake drum to effect a maximum braking action therebetween.

Another object of the invention is to provide a brake construction wherein both ends of the brake shoes are free for sliding movement to enable equalized braking contact of the shoes with the brake drum throughout the length of the shoes regardless of wear, thus eliminating frequent adjustment of the brake to compensate for wear between the parts.

Another object of the invention is the provision of a brake construction for motor vehicles which is simple and inexpensive of construction and repair, and positive of operation to braking and release positions to avoid jamming of the parts.

With these and other objects in view, the invention resides in the certain novel construction, combination and arrangement of parts, the essential features of which are hereinafter fully described, are particularly pointed out in the appended claims, and are illustrated in the accompanying drawings, in which:

Figure 1 is a circumferential sectional view through the brake construction, the parts being illustrated in normal released position.

Figure 2 is a horizontal sectional view on the line 2—2 of Figure 1 looking in the direction of the arrows.

Figure 3 is an enlarged vertical transverse sectional view on the line 3—3 of Figure 1.

Figure 4 is a fragmentary sectional front elevational view showing the position of the parts when in braking position.

Figure 5 is a detail perspective view of one of the floating pulleys and its support.

Referring to the drawings by reference characters, the numeral 10 designates a rotatable brake drum of the conventional construction having an axle opening 11 centrally in the closed side wall thereof. The opposite side of the drum 10 is open and against which a fixed anchor plate 12 is disposed, the said plate 12 having a central opening 13 in an axial alinement with the opening 11 for the passage of the axle of a motor vehicle.

Fixed to the inside of the plate 12 and diametrically disposed on a substantially horizontal plane are bearing blocks 14—14, the same extending into the drum 10. The bearing blocks 14 are provided with vertical bores 15, the purpose of which will be presently explained.

Disposed within the drum 10 is a pair of diametrically opposed segmental brake shoes 16—16, each of which includes an arcuate flange 17 on which the brake lining 18 is mounted, and an inwardly extending web 19. Pivoted to opposite ends of each brake shoe 16 are pins 20, the said pins freely extending into the bores 15 of the bearing blocks 14. In view of the fact that the brake shoes 16 are oppositely disposed, the pivoted ends 20 of the respective shoes extend through opposite sides of the bearing blocks 14 and interposed between the inner ends of the opposed pins, are tension springs 21 which act to prevent rattling of the pins in the bores 15 due to any vibration imparted to the brake structure.

The web 19 of each brake shoe 16 adjacent opposite ends thereof, is provided with inwardly converging rack bars 22—22, the material of the web 19 on which the teeth of the rack bar is formed, may be widened as shown in the drawings to provide sufficient surface for engagement by the gears to be presently described.

Associated with each brake shoe 16 for the purpose of actuating the same to an expanded braking position with respect to the brake drum, there is provided a pair of bell crank levers 23—23 pivoted on the same horizontal axis as at 24 to posts 25 extending inwardly from the anchor plate 12. Each pair of bell crank levers 23 include horizontally disposed lapping forked arms 26, the said arms 26 having alined elongated slots 27 therein. The bell crank levers 23 also include relatively short angularly extending forked arms 28, the free ends of which serve as bearings for rotatably supporting gears 29. Extending through the normally alined elongated slots 27 of the arms 26, is a pin or stub shaft 30 on which a floating pulley 31 is mounted. As previously mentioned, each brake shoe 16 is associated with a like actuating mechanism so that the pins or stub shafts 30 of the respective mechanism are disposed diametrically as best seen in Figure 1 of the drawings.

A bearing post 32 extends inwardly from the anchor plate 12 and is disposed on a horizontal plane in alinement with the axis or center of the bearing plate and rotatably mounted on a pin 33 carried by the post 32, is a fixed pulley 34. Diametrically opposite the fixed pulley 34 and also extending from the plate 12 is a post 35 to which one end of a metallic actuating cable 36 is fixedly connected. The cable 36 from its point of connection with the post 35 passes clockwise in Figure 1 over the upper floating pulley 31, over the fixed pulley 34, thence over the other floating pulley 31 from where it passes through a tubular guide 37 mounted on the anchor plate 12 to the exterior of the plate, from where it may pass to the manually actuated mechanism to be utilized for tensioning the cable to effect actuation of the brake mechanism. By reference to Figure 1 of the drawings, it will be seen that that portion of the metallic cable passing over the pulleys provides a substantially square or diamond shaped loop A, the length of the cable 36 having sufficient normal slack therein to hold the loop portion A taut but not under tension, for it is the tensioning of the loop A by exerting a pull upon the cable 36 which effects actuation of the brake mechanism by reason of the fact that such tension upon the cable causes the floating pulleys 31 to move inwardly, which movement imparts a rocking movement to the sets of bell crank levers to cause the arms 28 thereof to move outwardly during which movement the gears 29 meshing with the rack bars 22 impart simultaneous outward movement to the respective brake shoes 16, thus causing the brake shoes to operatively engage the drum 10. Contractile springs 38—38 have their ends respectively connected to the brake shoes 16—16 as at 39 and upon the release of any braking tension upon the cable 36, the springs 38 act to return the brake shoes 16—16, bell crank levers 23, and floating pulleys 31 to their normal position as shown in Figure 1 of the drawings. The position of the bell crank levers when in braking position is shown in Figure 4 of the drawings, and due to the leverage of the bell crank levers, only a slight movement of such levers will impart the necessary expanding movement to the brake shoes through the meshing gears 29 and rack bars 22.

While I have shown and described what I consider to be the most practical embodiment of my invention, I wish it to be understood that such changes and alterations as come within the scope of the appended claims may be resorted to if desired.

Having thus described the invention, what I claim as new and desire to secure by Letters Patent of the United States, is:—

1. A brake construction comprising in combination, a drum, a fixed plate closing one side of said drum, a pair of opposed brake shoes slidably supported by said plate and disposed within said drum, a fixed pulley, a pair of opposed floating pulleys, an actuating cable having one of its ends passing over said pulleys and fixed to said plate, spring means acting to normally urge said brake shoes to release position, and means operable by the inward movement of said floating pulleys upon tensioning of said cable to slide brake shoes to expanded position against the action of said spring means.

2. A brake construction comprising in combination, a drum, a fixed plate closing one side of said drum, a pair of opposed brake shoes slidably supported by said plate and disposed within said drum, a fixed pulley, a pair of opposed floating pulleys, an actuating cable having one of its ends passing over said pulleys and fixed to said plate, spring means acting to normally urge said brake shoes to release position, rack and gear means for actuating said brake shoes to expanded position, and lever means operable by the inward movement of said floating pulleys upon tensioning of said cable for operating said rack and gear means.

3. A brake construction comprising in combination, a drum, a fixed plate closing one side of said drum, a pair of opposed brake shoes slidably supported by said plate, spring means acting to normally hold said brake shoes in released position, a pair of bell crank levers for each shoe, said bell crank levers being pivotally supported by said plate and having one of their arms slotted and overlapping each other, a floating pulley supported by the lapping slotted arms of each pair of bell crank levers, a fixed pulley, a cable having one of its ends fixed opposite said fixed pulley, said cable passing over the floating pulleys and said fixed pulley and adapted to have its other end connected with a manually actuated mechanism, gears carried by the other arms of said bell crank levers, and rack surfaces provided on said shoes with which the respective gears engage.

4. A brake construction comprising in combination, a drum, a fixed plate closing one side of said drum, a pair of opposed brake shoes slidably supported by said plate, spring means acting to normally hold said brake shoes in released position, a pair of bell crank levers for each shoe, said bell crank levers being pivotally supported by said plate and having one of their arms slotted and overlapping each other, a floating pulley supported by the lapping slotted arms of each pair of bell crank levers, a fixed pulley, a cable having one of its ends fixed opposite said fixed pulley, said cable passing over the floating pulleys and said fixed pulley and adapted to have its other end connected with a manually actuated mechanism, a cable guide on said plate adjacent the fixed end of said cable through which the cable freely extends to the exterior of said plate, gears carried by the other arms of said bell crank levers, and rack surfaces provided on said shoes with which the respective gears engage.

5. A brake construction comprising in combination, a drum, a fixed plate closing one side of said drum, a pair of diametrically opposed brake shoes, means for slidably connecting the ends of said brake shoes to said plate, spring means acting upon said shoes to normally urge the same to released position, a fixed pulley, a pair of diametrically opposed floating pulleys, an actuating cable passing over said floating and fixed pulleys and having one of its ends fixed diametrically opposite said fixed pulley, and means actuated by the inward movement of said floating pulleys upon tensioning of said cable to slide said brake shoes into braking engagement with said brake drum against the action of said spring means.

6. A brake construction comprising in combination, a drum, a fixed plate closing one side of said drum, a pair of diametrically opposed brake shoes, a pair of diametrically opposed bearings on said plate, pivoted pins on the ends of said brake shoes slidably mounted in said bearings, spring means acting to normally hold said brake shoes in releasing position, an actuating cable having one of its ends fixed to said plate, pulleys over which the adjacent portion of said cable passes to form a loop in said cable, and means operable upon a pull upon the free end of said cable to tension and contract the loop to slide said brake shoes to expanded position against the action of said spring means.

7. A brake construction comprising in combination, a drum, a fixed plate closing one side of said drum, a pair of diametrically opposed brake shoes, a pair of diametrically opposed bearings on said plate, pivoted pins on the ends of said brake shoes slidably mounted in said bearings, spring means acting to normally hold said brake shoes in releasing position, an actuating cable having one of its ends fixed to said plate, a fixed pulley disposed diametrically opposite the fixed end of said cable, a pair of diametrically disposed floating pulleys, said cable passing over said fixed pulley and said floating pulleys to form a loop adjacent the fixed end of said cable, and means operable upon the inward movement of said floating pulleys upon tensioning of the loop to cause said brake shoes to slide to expanded position into braking engagement with said drum.

8. In a brake construction, a brake drum, a pair of opposed brake shoes, means for slidably supporting said brake shoes relative to said drum, individual actuating mechanism for sliding each shoe into braking engagement with said drum, each individual actuating mechanism including a pair of bell crank levers, gears carried by one of the ends of said bell crank levers, rack teeth on each shoe with which the gears engage, and means for simultaneously actuating the other ends of all of the bell crank levers to cause the gears and rack teeth to move the shoes to expanded position.

9. In a brake construction, a slidable brake shoe, inwardly converging rack surfaces provided adjacent the ends of said brake shoe, a pair of pivoted bell crank levers having overlapping arms, gears mounted in the other arms of said bell crank levers and respectively meshing with the rack surfaces, and means for simultaneously moving the lapped arms of said bell crank levers inwardly and the other arms thereof outwardly to impart a braking sliding movement to said brake shoe.

10. In a brake construction, a slidable brake shoe, inwardly converging rack surfaces provided adjacent the ends of said brake shoes, a pair of pivoted bell crank levers having overlapping arms, gears mounted in the other arms of said bell crank levers and respectively meshing with the rack surfaces, and a pin and slot connection between the lapping arms of said bell crank levers to cause the same to simultaneously operate, and actuating means associated with the pin of said pin and slot connection for moving the lapped arms of said bell crank levers inwardly to cause the gears to operate with said racks to move the brake shoe to braking position.

ABE B. BOIARSKY.